(12) United States Patent
Beshai

(10) Patent No.: US 6,920,131 B2
(45) Date of Patent: Jul. 19, 2005

(54) GLOBAL DISTRIBUTED SWITCH

(75) Inventor: Maged E. Beshai, Stittsville (CA)

(73) Assignee: Nortel Networks Ltd (CA)

( * ) Notice: Subject to any disclaimer, the term of this patent is extended or adjusted under 35 U.S.C. 154(b) by 910 days.

(21) Appl. No.: 09/748,848

(22) Filed: Dec. 28, 2000

(65) Prior Publication Data

US 2001/0006522 A1 Jul. 5, 2001

(30) Foreign Application Priority Data

Dec. 31, 1999 (CA) .............................................. 2293920

(51) Int. Cl.⁷ .............................................. H04L 12/50
(52) U.S. Cl. ....................... 370/380; 370/369; 370/389; 370/401
(58) Field of Search ................................. 370/369, 389, 370/400, 401, 357, 360, 380, 386, 387, 388, 427; 398/215, 55, 56, 57, 48, 49, 50

(56) References Cited

U.S. PATENT DOCUMENTS

| | | | |
|---|---|---|---|
| 5,467,347 A | * 11/1995 | Petersen ...................... | 370/230 |
| 5,623,489 A | * 4/1997 | Cotton et al. ................ | 370/381 |
| 5,835,491 A | * 11/1998 | Davis et al. ................. | 370/386 |
| 6,538,784 B1 | * 3/2003 | Lee et al. ..................... | 398/82 |
| 6,700,896 B1 | * 3/2004 | Beshai ........................ | 370/427 |

* cited by examiner

Primary Examiner—Bob A. Phunkulh
(74) Attorney, Agent, or Firm—Steubing McGuiness & Manaras LLP

(57) ABSTRACT

A flexible global distributed switch adapted for wide geographical coverage with an end-to-end capacity that scales to several Petabits per second (Pb/s), while providing grade-of-service and quality-of-service control, is constructed from packet-switching edge modules and channel-switching core modules. The global distributed switch may be used to form a global Internet. The global distributed switch enables simple controls, resulting in scalability and performance advantages due to a significant reduction in the mean number of hops in a path between two edge modules. Traffic is sorted at each ingress edge module according to egress edge module. At least one packet queue is dedicated to each egress edge module. Harmonious reconfiguration of edge modules and core modules is realized by time counter co-ordination. The global distributed switch can be enlarged from an initial capacity of a few Terabits per second to a capacity of several Petabits per second, and from regional to global coverage. It can accommodate connections to legacy systems, such as IP-based networks, and provide connections over one or two hops among distant legacy devices, such as routers.

22 Claims, 14 Drawing Sheets

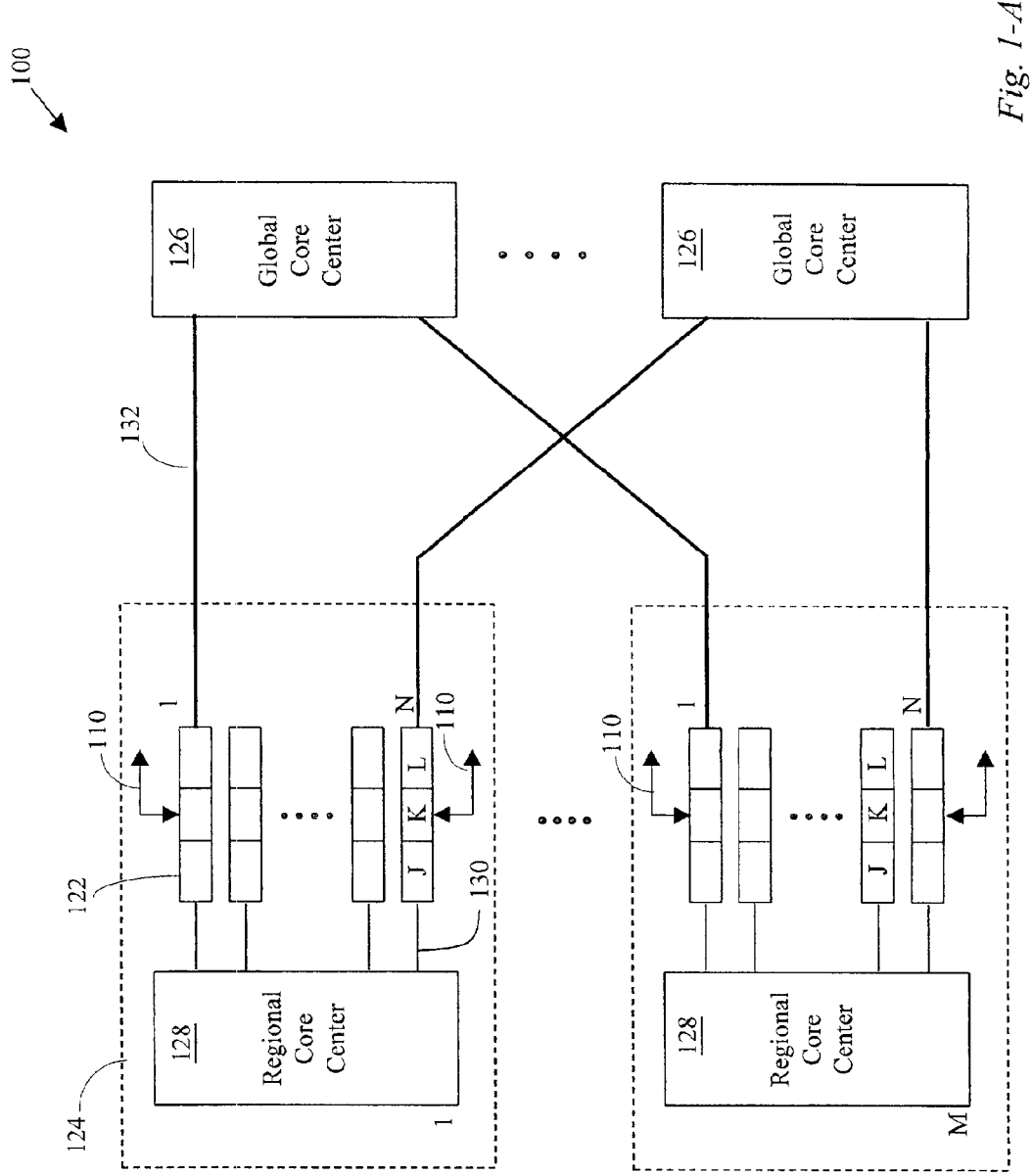
Fig. 1-A

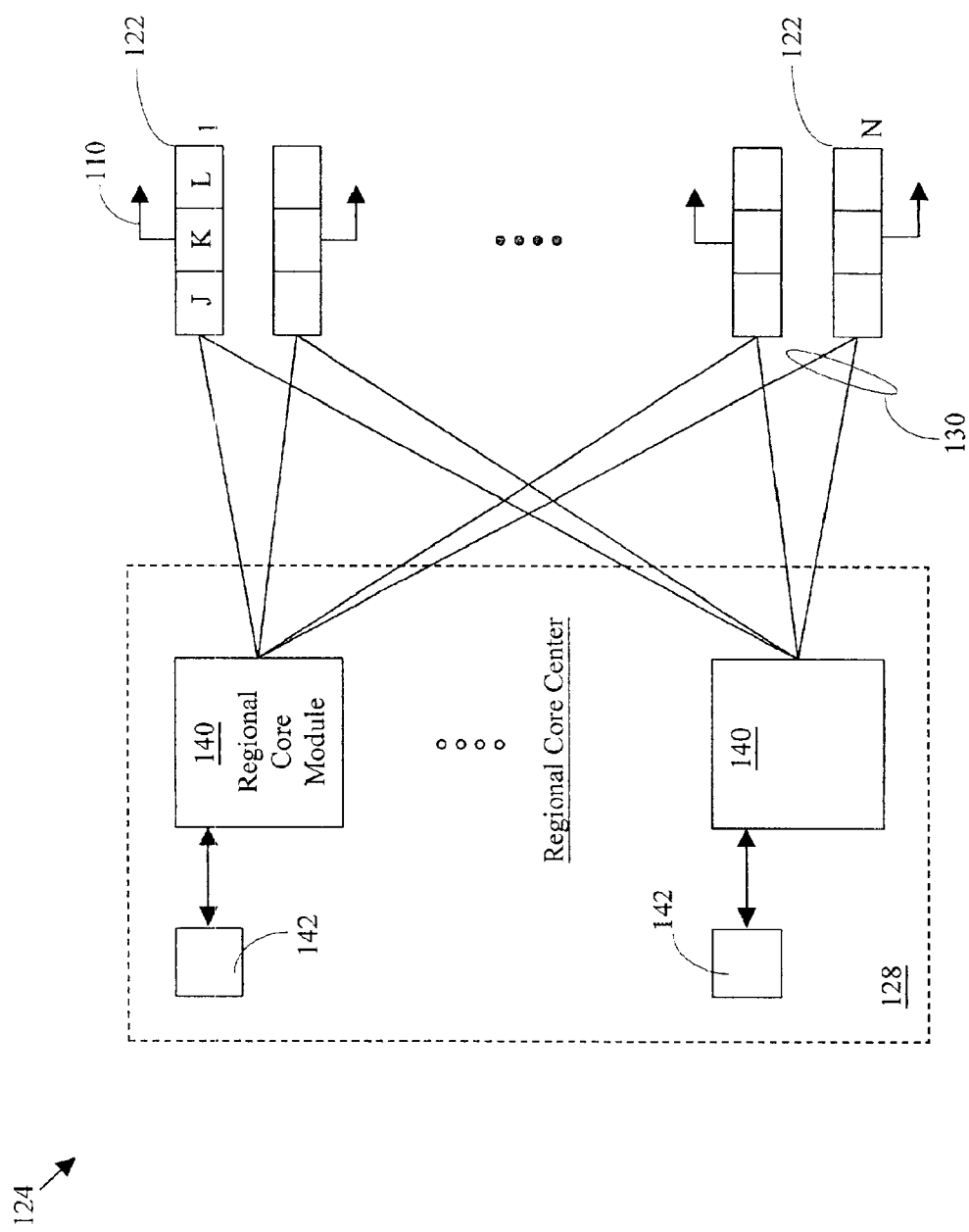
Fig. 1-B

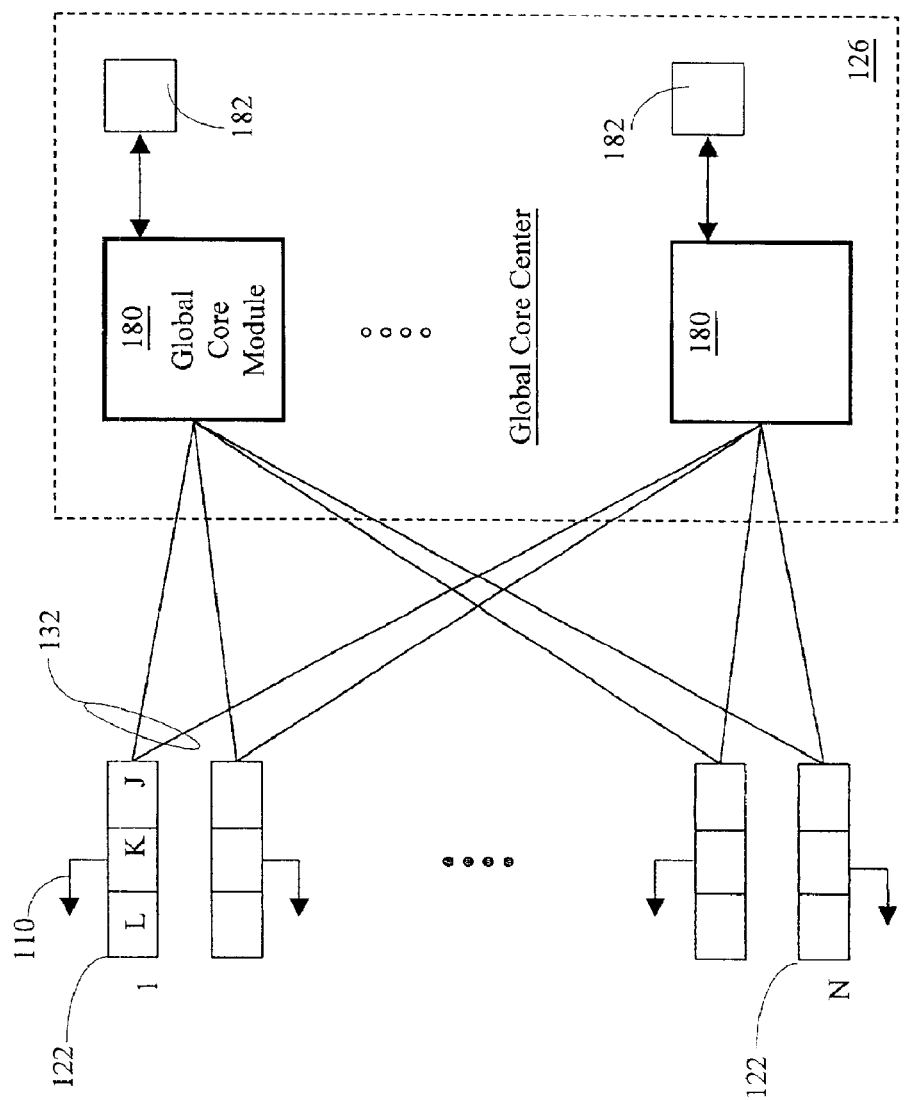
Fig. 1-C

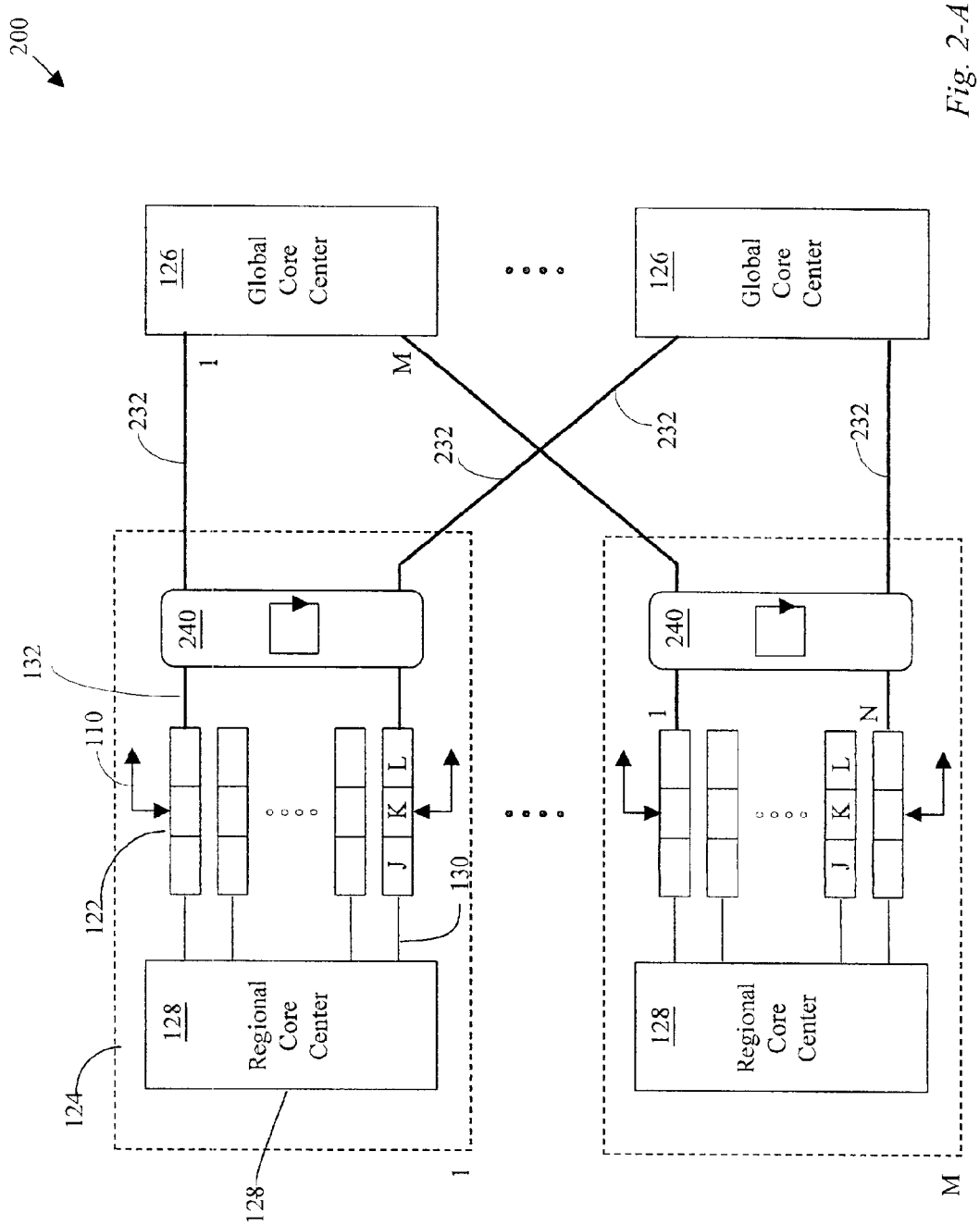
Fig. 2-A

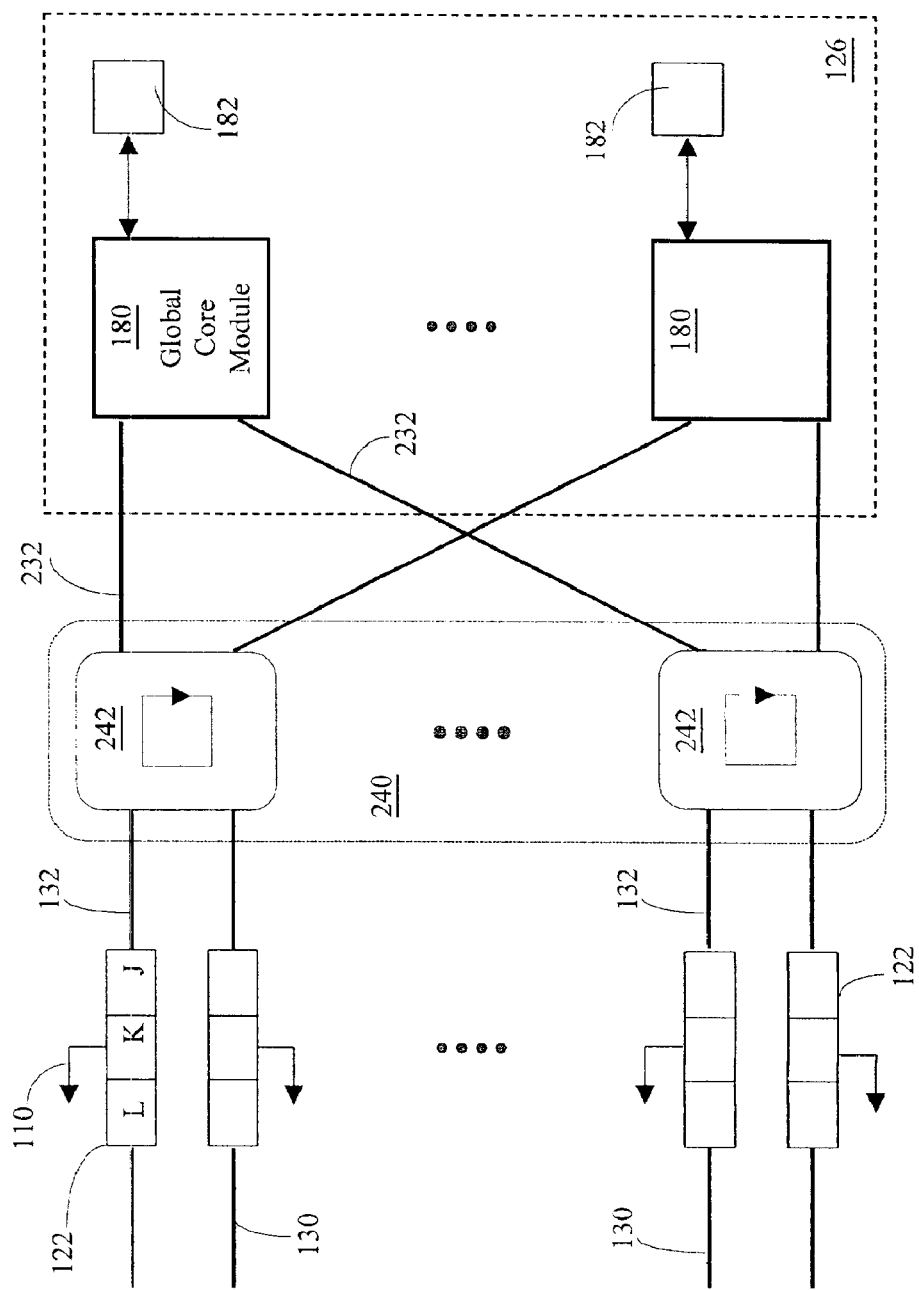
Fig. 2-B

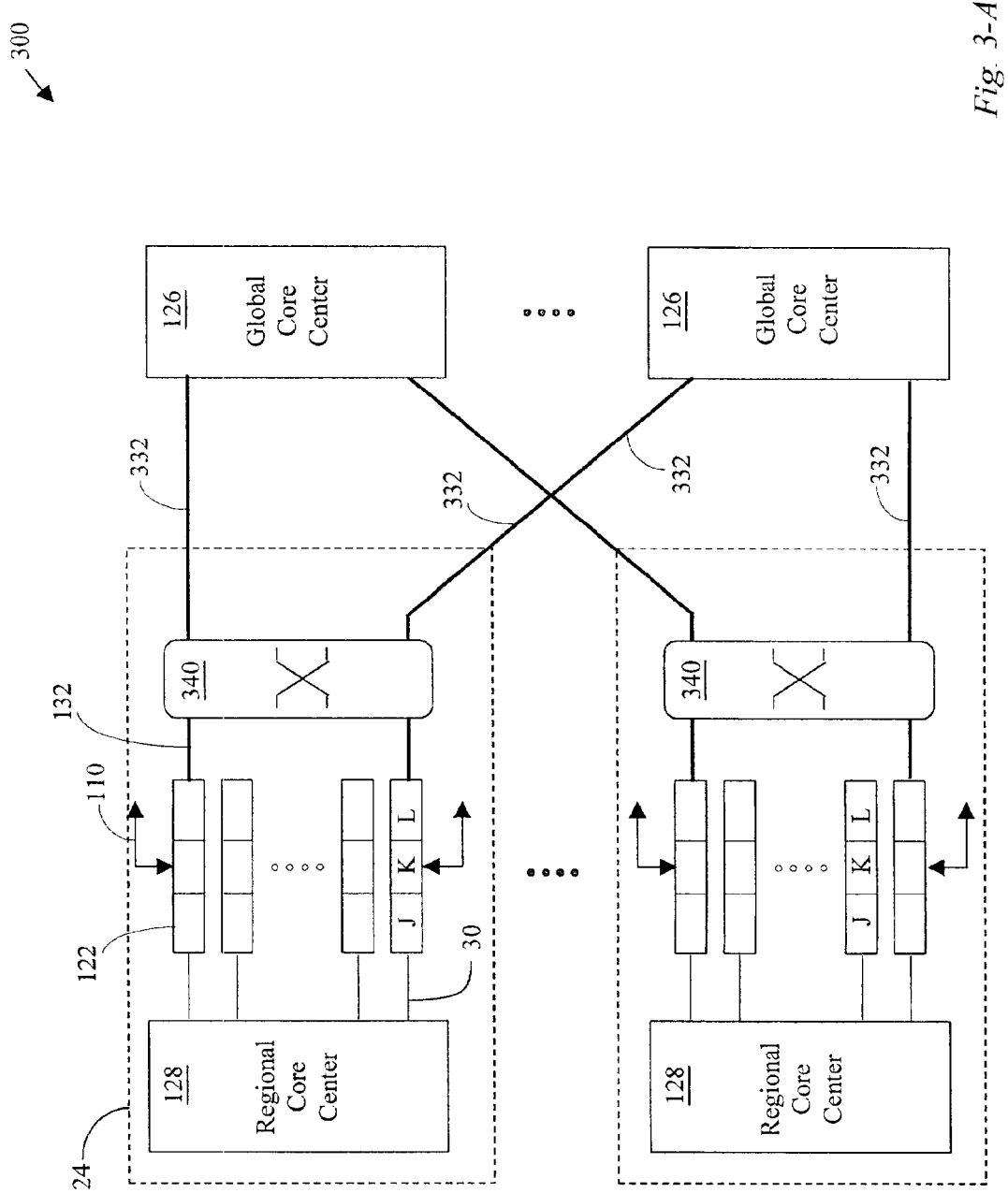
Fig. 3-A

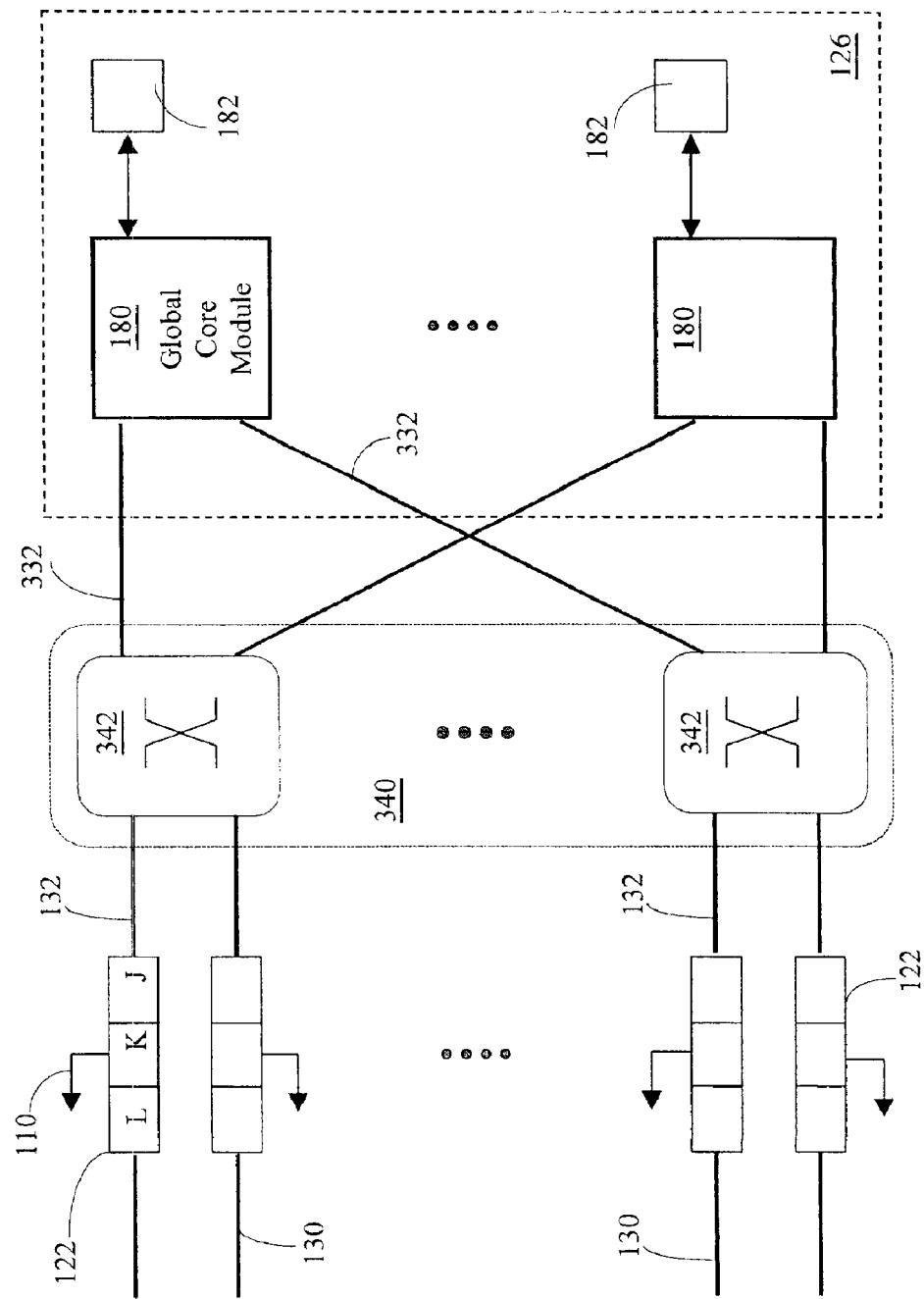
Fig. 3-B

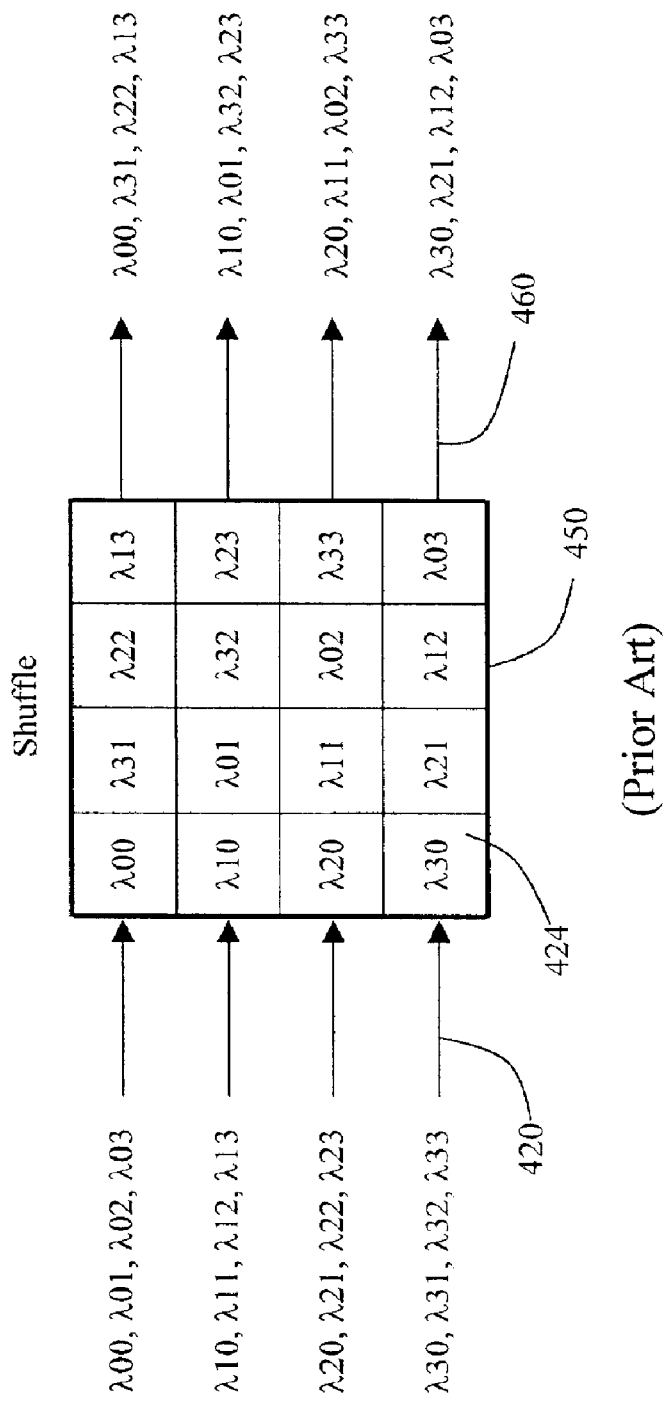
Fig. 4-A (Prior Art)

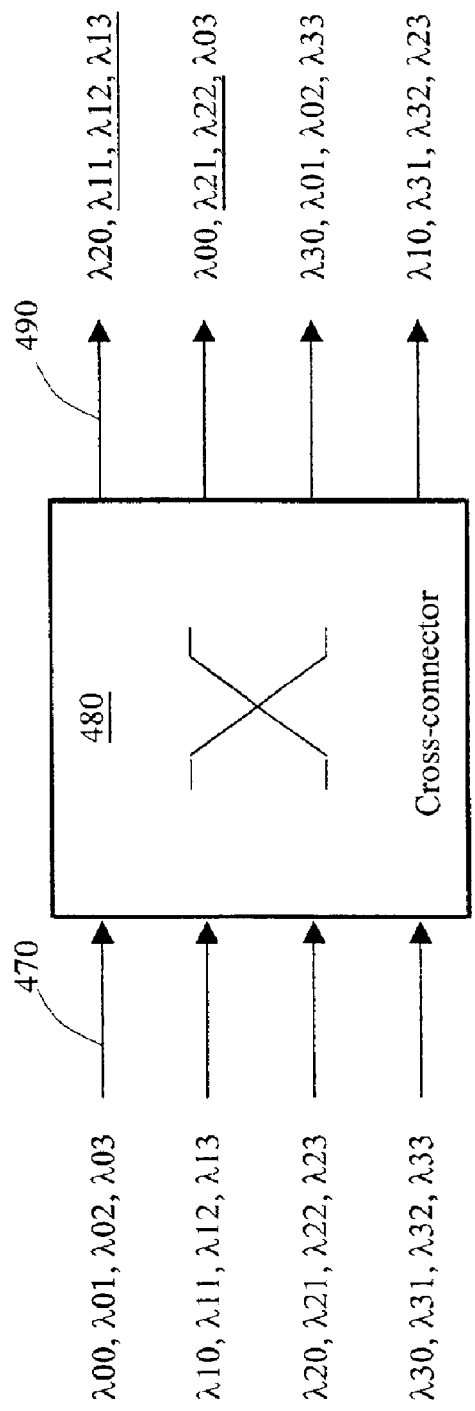
Fig. 4-B (Prior Art)

GLOBAL DISTRIBUTED SWITCH

STATEMENT REGARDING FEDERALLY SPONSORED RESEARCH OR DEVELOPMENT

This work was supported by the United States Government under Technology Investment Agreement TIA F30602-98-2-0194.

TECHNICAL FIELD

This invention relates generally to the field of high capacity, wide area distributed data packet switching. In particular, the invention relates to an architecture for a global distributed switch constructed using a plurality of geographically distributed regional data packet switches.

BACKGROUND OF THE INVENTION

The explosive growth of the Internet and a corresponding growth in corporate communications have strained existing telecommunications infrastructure. Much of the poor performance of current networks can be attributed to the structure of the networks. In general, modern networks consist of a plurality of small capacity nodes interconnected by a plurality of links. Consequently, most connections require a plurality of "hops", each hop traversing a link between two nodes. It is well understood that as the number of hops involved in a connection increases, the more complex connection routing and control becomes, and the more quality of service is likely to be degraded. A high quality of service cannot be easily realized in a network of low capacity switches where a connection may require several hops, causing cumulative degradation of service quality.

It is well known that high capacity networks can reduce connection blocking and improve quality of service. In general, high capacity variable-size data packet switches, hereinafter referred to as universal switches, are desirable building blocks for constructing high performance, high capacity networks. A universal switch transfers variable-size packets without the need for fragmentation of packets at ingress. It is also rate regulated to permit selectable transport capacities on links connected to other universal switches. A universal switch is described in Applicant's co-pending United States Patent Application entitled RATE-CONTROLLED MULTI-CLASS HIGH-CAPACITY PACKET SWITCH which was filed on Feb. 4, 1999 and assigned Ser. No. 09/244,824, the specification of which is incorporated herein by reference.

Due to the high-volatility of data traffic in large networks such as the Internet and the difficulties in short-term engineering of such network facilities, a distributed packet switch with an agile core is desirable. Such a switch is described in Applicant's co-pending United States Patent application entitled SELF-CONFIGURING DISTRIBUTED SWITCH which was filed on Apr. 6, 1999 and assigned Ser. No. 09/286,431, the specification of which is incorporated herein by reference. In a switch with an agile core, core capacity allocations are adapted in response to variations in spatial traffic distributions of data traffic switched through the core. This requires careful co-ordination of the packet switching function at edge modules and a channel switching function in the core of the switch. Nonetheless, each edge module need only be aware of the available capacity to each other edge module in order to schedule packets. This greatly simplifies the traffic control function and facilitates quality-of-service control.

Several architectural alternatives can be devised to construct an edge-controlled wide-coverage high capacity network. In general the alternatives fall into static-core and adaptive-core categories.

Static-core

In a static core switch, the inter-module channel connectivity is fixed (i.e., is time-invariant) and the reserved path capacity is controlled entirely at the edges by electronic switching, at any desired level of granularity. Several parallel paths may be established between an ingress module supporting traffic sources and an egress module supporting traffic sinks. The possible use of a multiplicity of diverse paths through intermediate modules between the ingress module and the egress module may be dictated by the fixed inter-module connectivity. A path from an ingress module to an egress module is established either directly, or through switching at an intermediate module. The capacity of a path may be a fraction of the capacity of each of the concatenated links constituting the path. A connection is controlled entirely by the ingress and egress modules and the core connectivity remains static. The capacity of a path is modified relatively slowly, for example in intervals of thousand-multiples of a mean packet duration; in a 10 Gb/s medium, the duration of a 1 K-bit packet is a 100 nanoseconds while a path capacity may be modified at intervals of 100 milliseconds. The path capacity is controlled at a source edge module and an increase in capacity allocation requires exchange of messages between the source edge module and any intermediate edge modules used to complete a path from a source edge module to a sink edge module.

Adaptive-core

Control at the edge provides one degree of freedom. Adaptive control of core channel connectivity adds a second degree of freedom. The use of a static channel interconnection has the advantage of simplicity but it may lead to the use of long alternate routes between source and egress modules, with each alternate route switching at an intermediate node. The need for intermediate packet-switching nodes can be reduced significantly, or even eliminated, by channel switching in the core, yielding a time-variant, inter-modular channel connectivity.

In a vast switch employing an optical core, it may not be possible to provide a direct path of adaptive capacity for all module pairs. The reason is twofold: (1) the granularity forces rounding up to an integer number of channels and (2) the control delay and propagation delay preclude instant response to spatial traffic variation. However, by appropriate adaptive control of channel connectivity in response to variations in traffic loads, most of the traffic can be transferred directly with only an insignificant proportion of the traffic transferred through an intermediate packet switch.

There is a need, therefore, for a distributed switch for global coverage that enables end-to-end connections having a small number of hops, preferably not exceeding two hops, and which is capable of adapting its core capacity according to variations in traffic loads.

Large, high-capacity centralized switches could form building blocks for a high-speed Internet. However, the use of a centralized switch would require long access lines and, hence, increase the access cost. Consequently, there exists a need for a distributed switch that places edge modules in the vicinity of traffic sources and traffic sinks.

SUMMARY OF THE INVENTION

It is therefore an object of the invention to provide a switch with an adaptive core that operates to provide sufficient core capacity in a shortest connection between each ingress edge module and each egress edge module in a distributed switch.

The invention therefore provides a high capacity distributed packet switch comprising a plurality of edge modules, each edge module including at least three input/output (dual) ports, the at least three input/output ports being organized in groups of J, K, and L input/output ports. The J group of input/output ports is connected by communication links to a regional core center. The L group of input/output ports is connected by communications links to a multiplicity of global core centers. The K input/output group of ports is connected by communications links to data traffic sources and data traffic sinks.

Edge modules having moderate capacities, 2 Tb/s each for example, can be used to construct a network of several Pb/s (Petabits per second) capacity if two-hop connections are acceptable for a significant proportion of the traffic. In a two-hop connection, packet-switching occurs at an intermediate edge module between an ingress edge module and an egress edge module.

The edge modules are preferably universal switches described in Applicant's co-pending Patent application filed Feb. 4, 1999. A distributed packet switch of global coverage comprising a number of electronic universal switch modules interconnected by a distributed optical core is preferred. The distributed core comprises a number of memoryless core modules, and each core module comprises several parallel optical space switches. In order to enable direct connections for traffic streams of arbitrary rates, the inter-module connection pattern is changed in response to fluctuations in data traffic loads.

The capacity of a distributed switch in accordance with the invention is determined by the capacity of each edge module and the capacity of each of the parallel space switches in the core. The distributed switch enables an economical, scalable high-capacity, high-performance Internet.

The distributed switch may be viewed as a single global switch having intelligent edge modules grouped into a number of regional distributed switches, also called regions, the regional distributed switches being interconnected to form the global switch. Although there is an apparent "hierarchy" in the structure of the global distributed switch in accordance with the invention, the global distributed switch in accordance with the invention is in fact a single-level, edge-controlled, wide-coverage packet switch.

BRIEF DESCRIPTION OF THE DRAWINGS

Further features and advantages of the present invention will become apparent from the following detailed description, taken in combination with the appended drawings, in which:

FIG. 1-A is a schematic diagram illustrating an architecture for a global distributed switch in accordance with the invention, in which an edge module is connected to a regional core center and a plurality of global core centers by multi-channel links;

FIG. 1-B shows the connectivity of edge modules to regional core modules;

FIG. 1-C shows the connectivity of edge modules to global core modules;

FIG. 2-A is a schematic diagram illustrating the architecture of a global distributed switch in accordance with the invention, in which multi-channels from an edge module in a region to the plurality of global core centers are shuffled so that an edge module can connect to several edge modules in other regions;

FIG. 2-B illustrates the use of an array of shufflers, instead of a single higher-capacity shuffler, in the architecture of FIG. 2-A;

FIG. 3-A is a schematic diagram illustrating an architecture for a global network in accordance with the invention, in which a plurality of channels from an edge module connect to several global core centers through a cross-connector to permit adjustments of channel allocation according to estimated changes in spatial traffic distributions;

FIG. 3-B illustrates the use of an array of cross connectors, instead of a single higher capacity cross connector, in the architecture of FIG. 3-A;

FIG. 4-A schematically illustrates the "shuffling" of wavelength division multiplexed (WDM) channels between a high capacity edge module and a plurality of global core centers in a global network in accordance with the invention;

FIG. 4-B schematically illustrates the cross-connection of WDM channels between a high capacity edge module and a plurality of global core centers in a global network in accordance with the invention;

FIG. 8 is a connection matrix showing intra-regional connectivity and a further example of inter-regional channel allocation when the global distributed switch is connected as shown in FIG. 1-A; and FIG. 9 is a connection matrix showing intra-regional connectivity and an example of inter-regional channel allocation when the global distributed switch is connected as shown in FIG. 2-A or FIG. 3-A.

It will be noted that throughout the appended drawings, like features are identified by like reference numerals.

DETAILED DESCRIPTION OF THE PREFERRED EMBODIMENT

Figure 5:
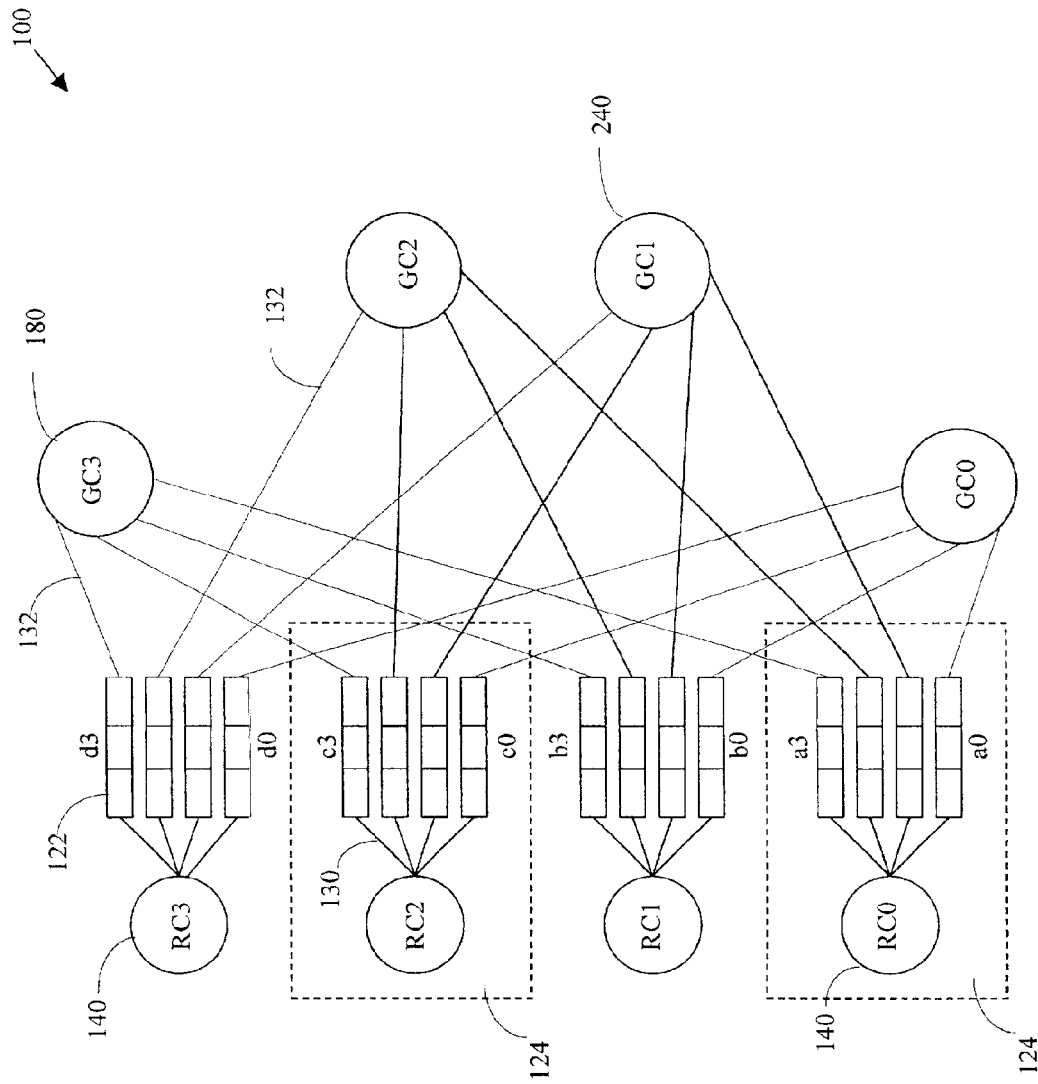
FIG. 5 is a schematic diagram of an exemplary medium capacity global distributed switch, the structure of which is modeled after the structure of the global distributed switch shown in FIG. 1.

A high-performance global distributed switch, forming a global network with a capacity of an order of several Petabits per second (Pb/s) is provided by the invention. In accordance with the invention, the high-performance global distributed switch includes high capacity (Terabits per second) universal switches as edge modules, and an agile channel-switching core. Control of the global distributed switch is exercised from the edge modules.

As shown in FIG. 1-A, a global distributed switch 100 in accordance with the invention includes a plurality of edge modules 122 that are clustered to form distributed regional switches 124, also called regions for brevity. The distributed regional switches 124 are interconnected by global core centers 126, which are preferably adaptive optical switches, as will be explained below in more detail. The edge modules of a distributed regional switch 124 are interconnected by a regional core center 128. Each regional core center 128 comprises a plurality of regional core modules 140 as illustrated in FIG. 1-B and each regional core module 140 is associated with a regional module master controller 142. Each edge module 122 preferably has a large number of dual ports (a dual port comprises an input port and an output port). The edge modules 122 are preferably universal data packet switches. A universal data packet switch is an electronic switch that switches variable-size data packets under rate control. The universal switch handles rate regulated traffic streams as well as "best effort" unregulated traffic streams. For the latter, a universal switch allocates service rates internally based on the occupancy of packet queues. The universal data packet switch is described in Applicant's co-pending United States Patent application entitled RATE-CONTROLLED MULTI-CLASS HIGH-CAPACITY PACKET SWITCH which was filed on Feb. 4, 1999 and assigned Ser. No. 09/244,824, the specification of which is incorporated herein by reference.

FIG. 1-B shows the connectivity of edge modules 122 to regional core modules 140 in a regional core center 128. Each regional core module 140 has a controller 142. As will be explained below, controller 142 is preferably accessed through a collocated edge module 122 that is installed in the vicinity of a regional core module 140.

FIG. 1-C shows the connectivity of edge modules 122 to global core modules 180 within a single global core center 126. Each global core module 180 has a controller 182 which is preferably accessed through an edge module 122 that is collocated with said each global core module 180. Edge module 122 connects to a plurality of global core centers 126;

Distributed Regional Switch

As mentioned earlier, the global distributed switch 100, 200, or 300, is preferably constructed by interconnecting a number of regional distributed switches 124. This is discussed in further detail below. The distributed regional switch (region) 124 includes N>1 edge modules 122 and a number, C1, of regional core modules 140 constituting a regional core center 128. Each regional core module 140 comprises a number of space switches operating in parallel (not shown). A regional core center 128 having J parallel space switches may be divided into a number of regional core modules 140 that may be geographically distributed over an area bounded by a propagation-delay upper-bound, for example five milliseconds. The rate of reconfiguration of a regional core module 140 is bounded by the highest round-trip propagation delay from an edge module 122 to the regional core module 140 within the coverage area. For example, if the round-trip propagation delay from an edge module 122 to a regional core module 140 is 4 milliseconds, then said regional core module can only reconfigure at intervals exceeding 4 milliseconds. Thus, among the edge modules 122 connected to a regional core module 140, the edge module of highest round-trip propagation delay, to and from said regional core module 140, dictates the upper bound of the rate at which said regional core module can be reconfigured.

A channel-switching core center having a number of channel-switching core modules is described in Applicant's co-pending U.S. patent application Ser. No. 09/475,139, filed on Dec. 30, 1999 and entitled AGILE OPTICAL-CORE DISTRIBUTED PACKET SWITCH, according to which a core module is constructed as a set of parallel space switches. The core center described in application Ser. No. 09/475,139 can serve either as a regional core center 140 or a global core center 180.

Each space switch in a regional core module 140 in a regional core center 128 having N edge modules 122, has N input ports and N output ports. The total number of space switches in a regional core center 128 equals the number of inner channels, J, carried on links 130 connected to each edge module 122. The sum of said different numbers of parallel space switches is limited to be less than or equal to J.

The regional core modules 140 within a regional core center 128 may have unequal sizes, having different numbers of parallel space switches. The space switches in each regional core center 128 are, however, identical and each regional core module 140 includes at least two space switches. The sizes (number of space switches) of the regional core modules are preferably adapted to match the spatial traffic distribution so that a high proportion of traffic can use paths of least propagation delay.

A regional core module 140 may include photonic switches or electronic switches. If an electronic switch is used in a regional core module 140, optical-electrical conversion will be needed at the input interface and electrical-optical conversion will be needed at the output interface of the regional core module 140.

Regardless of the core type, optical or electronic, each regional core center 128 is preferably partitioned into core modules 140 for two reasons: economics and security. Similarly, each global core center 126 is preferably partitioned into global core modules 180.

Time Coordination

In the high capacity global network according to the present invention, each region 124 would include a number of distributed regional core modules 140 (FIG. 1-B), and each global core center 126 would include a number of distributed global core modules 180 (FIG. 1-C). Each core module, whether regional or global, must have an associated and collocated edge module 122 for control purposes. A controller is connected to a port, or a number of ports, of collocated edge module 122. A regional core module 140 or a global core module 180 is not directly connected to a controller. Instead, an edge module 122 that is collocated with a regional core module 140 receives a channel, or a number of time-slots of a time-slotted channel, from each other edge module 122 connected to the regional core module. The data sent from each edge module 122 to an edge module 122 collocated with a specific core module include payload data as well as reconfiguration control data. In turn, each edge module 122 must have a number of timing circuits equal to the number of regional core modules 140 in the specific region to which said edge module belongs. Each edge module 122 must also have a number of additional timing circuits, said number being equal to the number of global core modules 180 to which said edge module connects.

An edge module 122 collocated with a regional core module 140 hosts a regional core module controller 142 which functions as a master controller of the regional core module. An edge module 122 collocated with a global core module 180 hosts a global core module controller 182 which functions as a master controller of the global core module.

In the networks (distributed global switches) of FIGS. 1-A, 2-A, 3-A, the regions 124 need not have identical structures. However, they are shown as such for clarity of illustration. There are N edge modules 122 connecting to each regional core module 140-A. Master controller 142-A of regional core module 140-A must receive data from N edge modules. Each of the N edge modules sends reconfiguration requests to controller 142-A. An edge module 122-Y may request an increase in capacity to edge module 122-W, for example an increase from one channel to two channels, or from 12 time slots in a slotted channel to 16 time slots in a slotted channel.

The collocation of an edge module 122 with a core module 140 or 180 is necessary if the core module 140 or 180 is an optical switch. If, instead of connecting a controller to a collocated edge module 122, controller 142-A is connected directly to an optical core module 140-A, each edge module 122 connected to optical core module 140-A must dedicate an entire channel (wavelength) to core module 140-A and the entire channel is then switched to the controller 142-A of the optical core module 140-A. Controller 142-A must then have N high-speed ports to receive requests from each edge module and N high-speed ports to send instructions back to the edge modules. Thus, with N=128 for example, the interface capacity of the controller 142-A would have to accommodate 128 channels, even though the control information exchange with the edge modules may require a very small fraction of such capacity.

The preferred solution is to require that a selected edge module 122-B host master controller 142-A at one of the ports of said selected edge module 122-B. Since the core module 140-A must change connectivity frequently, either through channel switching, or through time-slot pattern change, then edge module 122-B and core module 140-A must be collocated (within a 100 meters for example) so that the propagation delay between them is negligible and the propagation delay from a distant edge module 122 to core module 140-A is substantially the same as the propagation delay from said distant edge module to collocated edge module 122-B.

Each edge module 122 that communicates with core module 140-A must be time locked to core-Node 140-A by being time locked to controller 142-A which is supported by collocated edge module 122-B. Edge module 122-B continues to serve its traffic sources and sinks like any other edge module 122. Only one dual port (input port/output port) would normally be needed to support controller 142-A and the remaining ports support traffic sources and traffic sinks. Details of time locking, also called time coordination, are described in United States Patent Application titled SELF-CONFIGURING DISTRIBUTED SWITCH which was filed on Apr. 6, 1999 and assigned Ser. No. 09/286,431, the contents of which are incorporated herein by reference.

Similarly, a selected edge module 122 is collocated with a global core module 180 for control and time-coordination purposes. It is possible to collocate a specific edge module 122 with both a regional core module 140 and a global core module 180 to provide the control and time-coordination functions for each of the core modules 140 and 180. The collocated edge module 122 would then provide a control data path to a regional core module controller 142 (FIG. 1-B) and also provide another control data path to a global core module controller 182 (FIG. 1-C), through one or more of the ports of said collocated edge module. Preferably, a regional core module controller 142 and a global core module controller 182 that are supported by the same edge module 122 should be connected to different ports of said edge module.

In overview, the edge modules and core modules are typically distributed over a wide area and the number of edge modules is much larger than the number of core modules. Each core module is associated with a selected edge module as described earlier. The selected edge module is collocated with the associated core module and hosts the core module's controller. The association of a selected edge module with the channel-switching core is explained in Applicant's co-pending U.S. patent application Ser. No. 09/286,431.

In a regional core center 128 having N edge modules 122, each space switch in a regional core module 140 in said regional core center 128 has N input ports and N output ports so that each one of said edge modules can be connected to each space switch in said regional core center. The total number of space switches in a regional core center 128 cannot exceed the number of inner channels J carried on links 130. The sum of the number of space switches in the core modules 140 of said regional core center 128 is less than or equal to J.

The regional core modules 140 within a regional core center 128 may have unequal sizes, i.e., different numbers of parallel space switches. Each regional core module 140 includes at least two space switches. The space switches in each regional core center 128 must have the same number of input ports and the same number of output ports.

Distributed Regional Switch with an Optical Core

Each edge module 122 has a fixed number $W \leq J$ of one-way channels to the core, and it receives a fixed number, preferably equal to $W \leq J$, of one-way channels from the core. The former are hereafter called A-channels, and the latter are called B-channels. A path from an edge module 122-X to an edge module 122-Y is formed by joining an A-channel that emanates from edge module 122-X to a B-channel that terminates on edge module 122-Y. Connecting the A-channel to the B-channel takes place at a space switch in a regional core module 140. The number of paths from any edge module 122 to any other edge module 122 can vary from zero to W. The process of changing the number of paths between two modules is a reconfiguration process that changes the connection pattern of edge module pairs. A route from an edge module 122-X to another edge module 122-Y may have one path or two concatenated paths joined at an edge module 122-U other than edge modules 122-X or 122-Y. This path is referenced as a loop path and it includes two hops. A larger number of concatenated paths, having several hops, may be used to form a route. However, this leads to undesirable control complexity.

If the core is not reconfigured to follow the spatial and temporal traffic variations, a high traffic load from an edge module 122-X to an edge module 122-Y may have to use one or more loop-path routes, as described above. A loop-path route is a route from an edge module 122-X to and edge module 122-Y that switches data at an intermediate edge module 122-U. A loop-path route may not be economical since it uses more transmission facilities and an extra step of data switching at an intermediate edge module. In addition, tandem packet switching in the loop path adds to delay jitter.

It is emphasized that the objective of reconfiguration is to maximize the proportion of the inter-edge-module traffic that can be routed directly without recourse to tandem switching in a loop path. However, connections from an edge module 122-X to an edge module 122-Y, which collectively require a capacity that is much smaller than a channel capacity, preferably use loop-path routes. Establishing a direct path in this case is wasteful unless the path can be quickly established and released, which may not be feasible. For example, a set of connections from an edge module 122-X to an edge module 122-Y collectively requiring a 100 Mb/s capacity in a switch core, with a channel capacity of 10 Gb/s uses only 1% of a channel capacity. If a core reconfiguration is performed every millisecond, the connection from edge module 122-X to edge module 122-Y could be re-established every 100 milliseconds to yield a 100 Mb/s connection. This means that some traffic data arriving at module 122-X may have to wait for 100 milliseconds before being sent to module 122-Y. A delay of that magnitude is unacceptable and a better solution is to use a loop path where the data traffic for the connections flows steadily via a tandem switched loop path through one of the edge modules 122 other than edge modules 122-X or 122-Y.

Preferably, a regional distributed switch 124 is tolerant to core-switching latency as described in Applicant's co-pending U.S. patent application Ser. No. 09/475,139, filed on Dec. 30, 1999 and entitled AGILE OPTICAL-CORE DISTRIBUTED PACKET SWITCH. In order to mask core-switching latency, a core module must have at least two switching planes operating in parallel. Preferably, a regional core module 140 should have a large number of parallel switching planes, 32 for example, and one plane is needed to implement advance reconfiguration as described in said patent application Ser. No. 09/475,139.

Distributed Regional Switch with an Electronic Core

In principle, the control of the data-transfer among the edge modules can be performed by packet-switching core modules (not illustrated), where each packet is routed independently. However, the high-rate of packet transfer may render a core-module controller unrealizable, because packet transfer from ingress to egress must be scheduled by a core-module controller. For example, in a 100 Tb/s packet switch serving as a core module, and with a mean packet length of 2000 bits, the packet arrival rate at full occupancy would be of the order of 50 Giga packets per second and it is difficult to schedule packets at such a high rate.

An alternative to packet-switching in the core is to establish inter-edge-module paths of flexible capacities that may be allocated in sufficiently-large units to reduce the control burden by replacing the packet scheduler with a capacity scheduler. For example, if the inter-edge-module capacity were defined in channel slots of $\frac{1}{16}$ of the channel capacity, the total number of channel slots in a 100 Tb/s switch with 10 Gb/s ports would be about 160,000. The packet switch would reconfigure periodically, every 10 milliseconds for example, or as the need arises in response to significant traffic-pattern changes. The time between successive reconfigurations is dictated by a propagation delay between the edge modules and the core modules, as will be discussed below. A capacity-scheduler computational load would thus be lower than the computational load in a core packet-scheduler, as described above, by three orders of magnitude. Preferably, a direct connection is provided for each edge module pair. The capacity for a connection is provisioned as an integer multiple of a capacity unit. A capacity unit can be a full channel, in a channel-switching core module, or a fraction of a channel-capacity, in a time-slot switching core module.

In order to provide direct paths for all edge-module pairs in a region 124, an internal capacity expansion at the edge modules 122 is required to offset the effect of under-utilized channels. The expansion may be determined by considering the case of full load under extreme traffic imbalance. Consider an extreme case where an edge module may send most of its traffic to another edge module while sending insignificant, but non-zero, traffic to the remaining (N−2) edge modules, resulting in (N−2) almost unutilized channel slots emanating from the edge module. The maximum relative waste in this case is $(N-2)/(S \times J)$, where N is the number of edge modules in a region 124, J is the number of channels connecting an edge module 122 to a regional core center 128, and S is the number of time slots per channel. With N=128, J=128, and S=16, yielding a region (regional distributed switch) capacity of 160 Terabits per second (Tb/s), at a 10 Gb/s channel capacity, the maximum relative waste is about 0.0625. The computation of the required number of channels, J, between an edge module 122 and a region 124 must take into account potential capacity waste (0.0625 in the above example) if direct paths are established for all pairs within a region.

Even with the use of time-slotted channels, it may be desirable, however, to aggregate traffic streams of low intensity in a conventional manner and perform an intermediate switching stage in order to avoid capacity waste. A traffic stream with an intensity of 0.1 of a channel-slot capacity can be switched at an intermediate point to conserve core capacity at the expense of a smaller waste in edge capacity. The threshold at which such a trade-off becomes beneficial is an engineering issue. Generally, it is desirable that only a very small proportion of the total traffic, preferably less than 5%, be switched at an intermediate point. This can be realized using a folded architecture where an edge module is enabled to switch incoming channels from a regional core module 140 to outgoing channels connected to any core module 140 in said regional core center 128. The edge modules 122 in global distributed switch structures 100, 200, and 300 are folded edge modules.

Global Switch

In overview, a global multi Peta-bits-per-second network, can be configured as shown schematically in FIG. 1. It includes a number of distributed regional switches 124, each with a capacity of the order of 40 to 160 Tb/s. The distributed regional switches (regions) 124 are interconnected by the global core centers 126 shown on the right side of FIG. 1. A global core center 126 may comprise a plurality of global core modules 180 as illustrated in FIG. 1-C. The optical wavelength shufflers 240 (FIG. 2-A), or cross-connectors 340 (FIG. 3-A), connecting the edge modules to the global channel switches are optional. Deploying shufflers 240 leads to a desirable distribution of channel connections as will be explained below in connection with FIG. 9. Deploying cross-connectors 340 adds a degree of freedom to the channel routing process resulting in increased efficiency, as will be illustrated, also with reference to FIG. 9. It is noted however that one or more of the cross connectors may be virtually static, being reconfigured over relatively long intervals.

Each edge module 122, which is implemented as an electronic switching node, has three interfaces: a source/sink interface, a regional interface, and a global interface. A plurality of optical wavelength shufflers 240 optical cross connectors 340 enhances network connectivity where each edge module 122 can have at least one channel to at least one edge module 122 in each region 124. The multiplicity of alternate paths for each edge-module-pair enhances the network's reliability.

FIG. 2-B illustrates a modular construction of a shuffler 240. Preferably, the shuffler 240 should be capable of directing any channel from incoming multi-channel link 132 to any channel in outgoing multi-channel link 232. The connection pattern is static and is set at installation time. A high capacity shuffler having a large number of ports is desirable. However, an array of shufflers of lower number of ports can be used to realize acceptable connectivity. FIG. 2-B illustrates the use of lower-size shufflers each connecting to a subset of the edge modules 122 of a region 124.

Similarly, FIG. 3-B illustrates the use of an array of lower-size cross connectors 342, each supporting a subset of the edge modules 122 of a region 124.

The outer-capacity of the network is the total capacity of the channels between the edge modules 122 and the traffic sources. The inner capacity of the network is the total capacity of the channels between the edge modules 122 and all the core modules, including both the regional core modules 140 and the global core modules 180. In an efficient network, the ratio of the outer-capacity to inner capacity is close to unity and the higher the proportion of traffic delivered via direct paths, the higher becomes said ratio of outer-capacity to inner capacity. The network structures according to the present invention aim at increasing this ratio.

Quadratic and Cubic Scalability

Two architectural alternatives can be used to realize a network of multi Peta bits per second capacity. The first uses edge modules of relatively high capacities, of the order of 8 Tb/s each, for example, and the second uses edge modules of moderate capacities, of the order of 2 Tb/s each. The total capacity in the first architecture varies quadratically with the edge-switch capacity. The capacity in the second architecture is a cubic function of the edge-switch capacity. The merits of each of the two architectures will be highlighted below.

Quadratic Scalability

A global distributed switch a100, 200, or 300 may have no regional core centers (J=0). An edge module 122 has (K+L) dual ports comprising (K+L) input ports and output ports. The K dual ports are connected to traffic sources and sinks. The L dual ports are connected to a maximum of L other edge modules by channels of capacity R bits/second each, yielding a fully-meshed network of (L+1) edge modules. The maximum traffic capacity is realized in a hypothetical case where each source edge module sends all its traffic to a single sink edge module, thus reducing a distributed switch of N1 edge modules to N1 point-to-point isolated connections, N1>1. This trivial hypothetical case is, of course, of no practical interest. The maximum non-trivial traffic capacity of a fully-meshed network is realized when the traffic load is spatially balanced so that each edge module transfers the same traffic load to each other edge module. The realizable network capacity is then $C=\eta \times K \times (L+1) \times R$, $\eta$ being a permissible mean occupancy (less than unity, typically about 0.8) of each channel, all the edge-to-edge traffic loads being statistically identical. Each edge module comprises a source module and a conjugate sink module, forming a paired source module and sink module. The source module and the sink module of an edge module normally share memory and control. Switching through an intermediate edge module is only realizable if the source and sink edge modules are paired and share the same internal switching fabric. If the capacities from each source edge module to each sink edge module are equal, then, with spatial traffic imbalance, a source edge module may have to transfer its traffic load to a given sink module through one or more intermediate edge modules (other than the source edge module and the sink edge module).

The use of intermediate edge modules 122 results in reducing the meshed-network traffic capacity below the value of the realizable capacity C. The network should be designed to accommodate violent traffic variation. In the extreme case where each edge module temporarily sends its entire traffic to a single sink module, other than its own conjugate sink module, the extra traffic load due to tandem transfer reduces the traffic capacity to a value slightly higher than 0.5×C. If a non-zero proportion of the traffic emanating from each source module is transferred through an intermediate edge module, then the ratio L/K (FIG. 10 must be greater than 1.0, i.e., more edge-module capacity is dedicated to core access than to source/sink access, and the overall traffic efficiency is about K/L. The selection of the ratio K/L depends on the spatial traffic imbalance (i.e., the variation of traffic intensity for different node pairs), and a mean value of 0.7 would be expected in a moderately volatile environment.

The transport capacity of an edge module, which equals (L+K)×R, R being the channel capacity in bits per second, limits the network capacity. With a ratio of L/K of 1.4, an edge module having a total number of dual ports of 384 ports for example (384 input ports and 384 output ports), with R=10 Gb/s, yields a maximum transport capacity of about 360 Tb/s using 225 edge modules (K=160, L=224). In the example above, the ratio of the outer capacity to inner capacity is about 0.70. The traffic capacity equals the transport capacity multiplied by the mean utilization $\eta$.

The ratio of outer capacity to inner capacity increases with core agility (frequent reconfiguration), because agility increases the opportunity to use direct paths. To accommodate extreme traffic distributions as described above, this ratio should be slightly higher than 0.5 in a static-core but can be selected to be about 0.95 with an agile self-configuring optical core.

If it is possible to adapt the core connections to traffic loads so that the capacities from a source edge module to a sink edge module is a function of the respective traffic load, then the overall capacity can be maximized to approach the ideal maximum capacity. In such case, the expansion ratio (L/K) can be reduced and with the 384-port edge module, K and L may be chosen to be 184 and 200 respectively (J has been set to zero in this example and K+L=384), yielding a regional distributed-switch transport capacity of about 370 Tb/s using 201 edge modules.

Cubic Scalability

Figure 7:
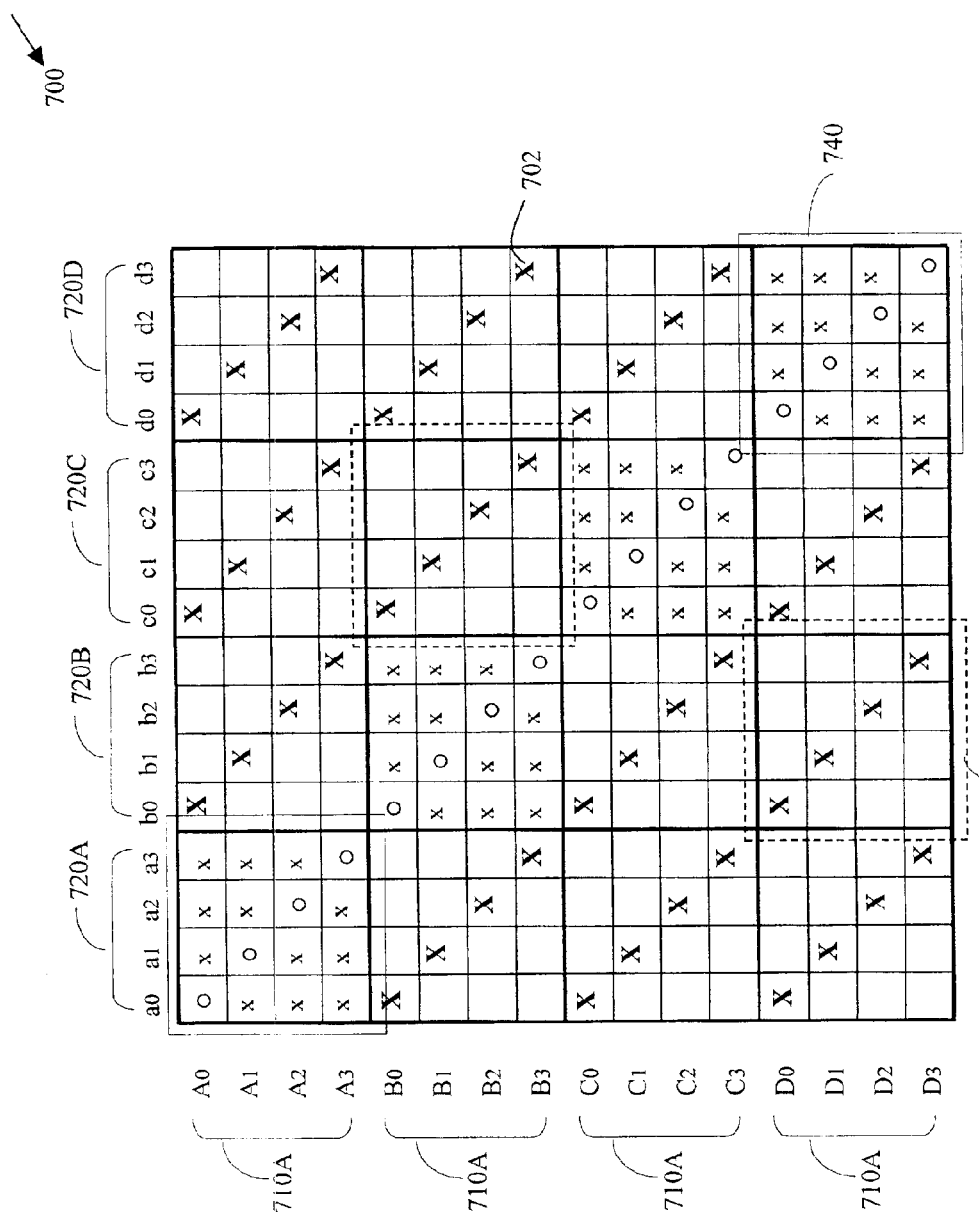
FIG. 7 is a connection matrix showing intra-regional connectivity and an example of inter-regional channel allocation when the global distributed switch is connected as shown in FIG. 1-A.

With references to FIGS. 1-A, 2-A, and 3-A, An edge module has (J+K+L) dual ports comprising (J+K+L) input ports and (J+K+L) output ports. The K dual ports are connected to traffic sources and sinks. The J dual ports are connected to a maximum of J other edge modules 122, yielding a fully meshed network-region of (J+1) edge modules. The maximum traffic capacity of a regional distributed switch (region) 124 being $C=\eta \times K \times (J+1) \times R$, where R is the capacity of a channel (corresponding to a wavelength in a WDM fiber link). The L dual ports (ingress ports and output ports) of an edge module 122 are connected to L other network regions 124. With a static core, each source edge module is connected to a sink edge module in the same region by at least one channel. There is a maximum of J alternate paths and each path has a maximum of two hops, i.e., requiring switching at an intermediate edge module 122. The total number of edge modules 122 in the entire global distributed switch 100, 200, or 300, is then (J+1)×(L+1). With static global core centers 126, each source edge module can reach each sink edge module of a different region 124 through several alternate paths of at most two hops each. With a static global core center 126 of uniform structure, having similar connectivity between regions, only one edge module 122 in a region is directly connected to an edge module 122 in another region as illustrated in FIG. 7. The maximum traffic capacity of the two-hop static-core network is realized when the traffic load is spatially balanced so that each edge module transfers the same traffic load to each other edge module. The network capacity is then $C=\eta \times K \times (J+1) \times (L+1) \times R$, $\eta$ being the permissible occupancy of each channel as defined above, all the edge-module to edge-module traffic loads being statistically identical. With the same edge-module parameters used for the example with J=0 described above. (384 dual ports each, R=10 Gb/s), and selecting L=K=J=128, the overall transport capacity grows to about 21.3 Pb/s, using 16641 edge modules 122. The ratio of the outer capacity to the inner capacity, in this example, is 0.5.

With agile regional core centers 128, and agile global core centers 126, the above high traffic capacities can be realized even with large variations of the spatial distribution of the traffic.

With a given edge-module capacity, capacities of the global distributed switch 100, 200, or 300 below the above upper-bound (C=η×K×(J+1)×(L+1)×R) result from the use of more than one channel from an edge module 122 to each other edge module 122 in the same region, and/or the use of more than one channel from each edge module in a region 124-A to each other region 124. In such cases, the number of edge modules 122 per region becomes J1≦(J+1) and the number of regions 124 becomes L1≦(L+1), and the traffic capacity of the global distributed switch is then:

$$C = \eta \times K \times (J1) \times (L1) \times R$$

In overview, the objective of an agile core is to adapt the ingress/egress capacity to follow the traffic load and, hence, to increase the proportion of direct routes.

FIG. 5 is a schematic of an exemplary medium capacity distributed switch 100 with agile core modules, 140 and 180, the structure of which is modeled after the structure of the global distributed switch 100 shown FIG. 1. The configuration of the global distributed switch shown in FIG. 5 is limited to a small number of edge modules 122, regional core (RC) modules 140, and global core (GC) modules 180, for clarity of illustration. There are four regional switches 124, each having four edge modules 122 and a single regional core module 140. The regional core modules 140 are labeled RC0 to RC3. The edge modules associated with RC0 are labeled $a_0$ to $a_3$, the edge modules associated with RC1 are labeled $b_0$ to $b_3$, and so on. There are four global core modules 180 labeled GC0 to GC3 interconnected as shown in FIG. 5. In the architecture shown in FIG. 5, each edge module 122 connects to only one of the global core modules 180. For example, edge module (122) $a_0$ connects by a two-way multi-channel link 132 to global core module GC0, while edge module a, connects by a two-way multi-channel link 132 to global core module GC1, and so on.

Figure 6:
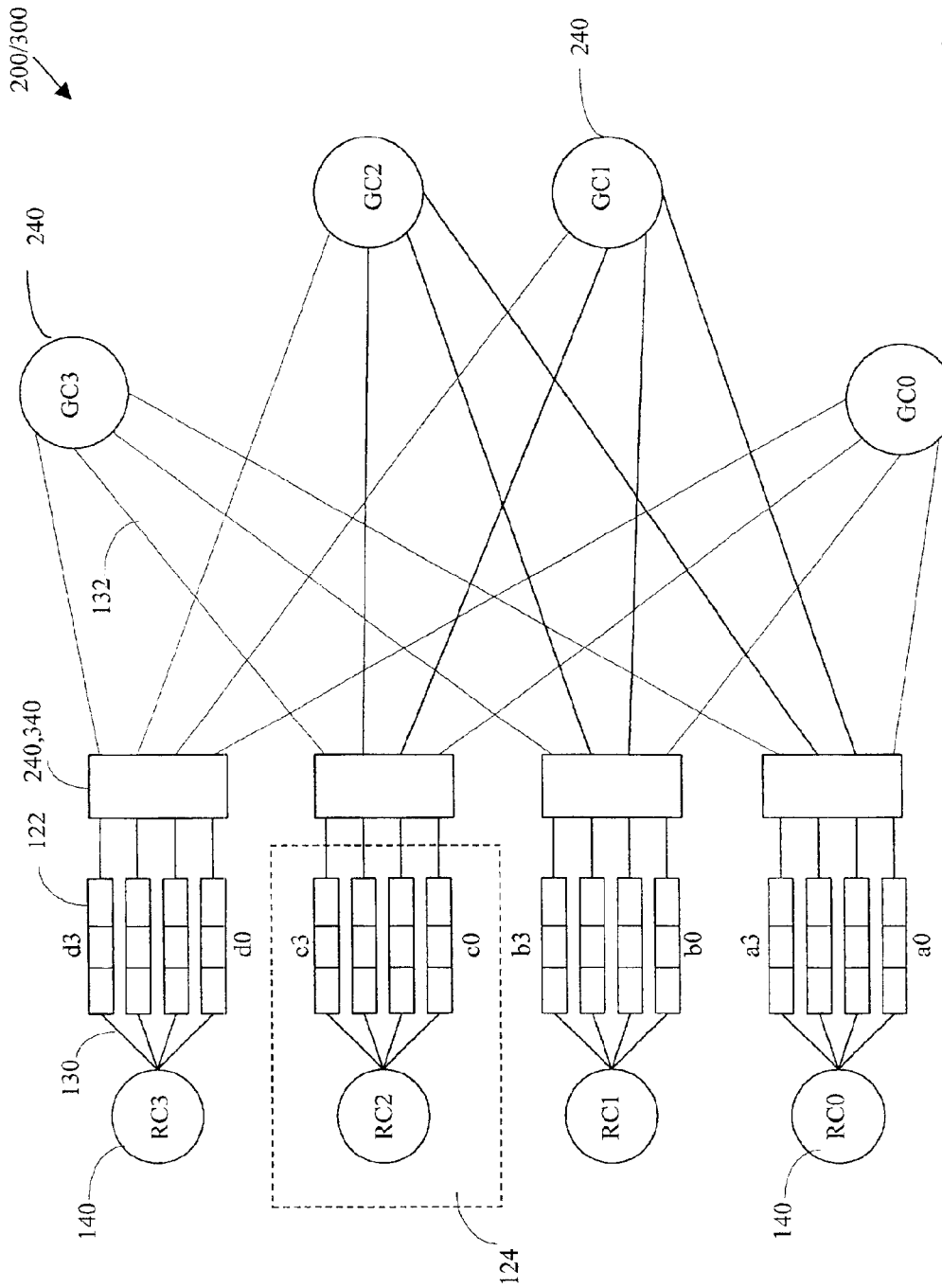
FIG. 6 is a schematic diagram in which a multi-channel link from each edge module to the global core modules is connected to a shuffler or a cross-connector adapted to modify channel connectivity to a plurality of global core modules.

FIG. 6 is a schematic diagram of a configuration for a global distributed switch 200 in which a multi-channel (L channel) link from each edge module 122 to the global core is connected first to a shuffler 240 or a cross-connector 340. The shuffler 240 is similar to the one shown in FIG. 4*a*, which shuffles 4-wavelength optical links. The shuffling of channels (wavelengths) results in enabling the inter-regional connectivity to be more distributed, thus increasing the opportunity to establish direct connections between an edge module in one region and an edge module in another region. In other words, this increases the proportion of single-hop connections, hence increasing the overall traffic capacity of the global distributed switch 200. Note the increased number of paths in the connectivity matrix 900 of FIG. 9, to be described below.

Figure 9:
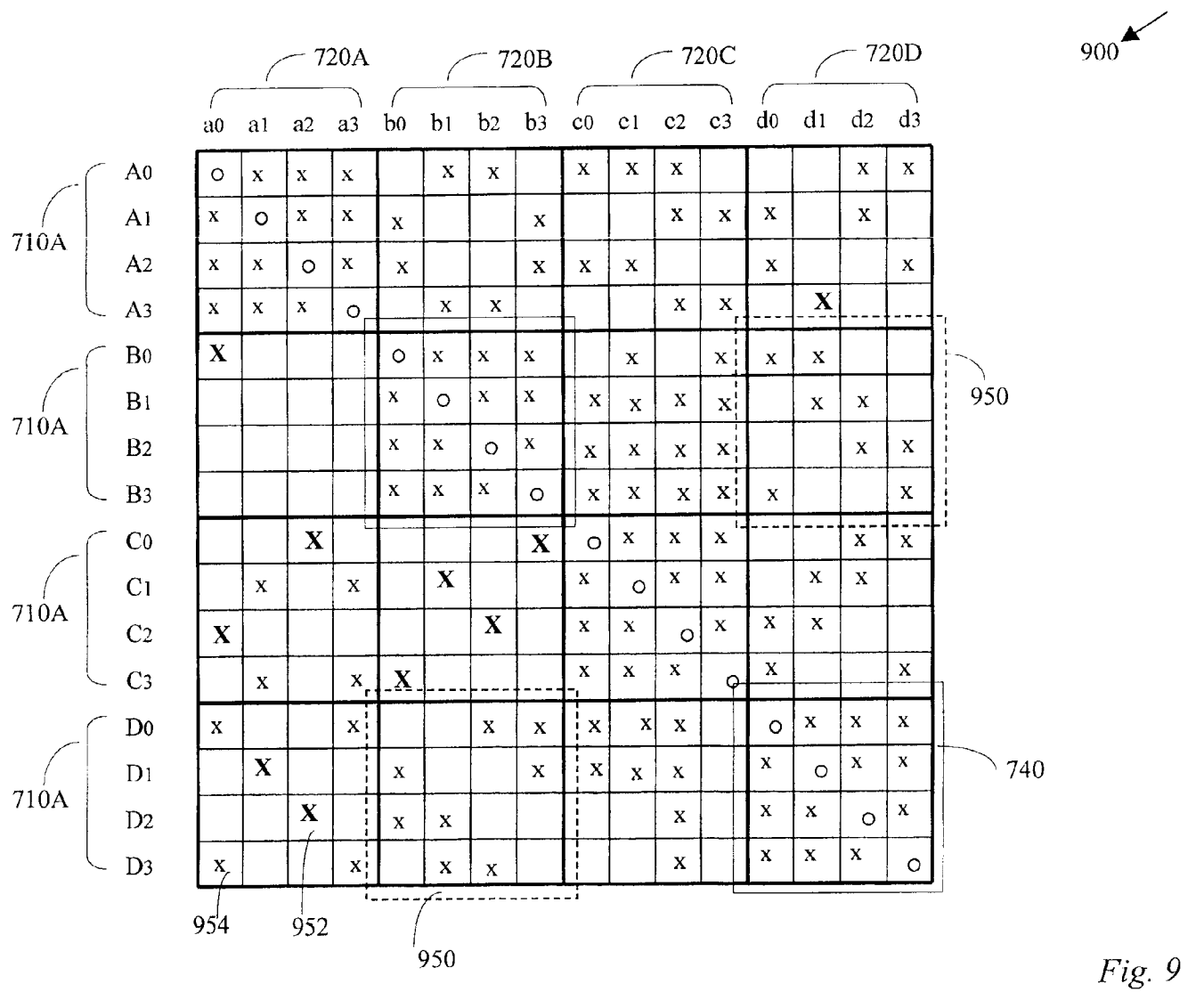

The connection matrix for the shuffler 240 shown in FIG. 6 is illustrated in FIG. 9. (FIG. 6 also refers to a cross connector 340.) With channel shufflers 240, the allocation of the inter-regional channels can be selected at installation to suit the anticipated traffic pattern.

The cross-connector 340 shown in FIG. 6 permits the inter-regional connectivity to be further enhanced by facilitating adaptive and unequal inter-regional channel assignment. This permits better adaptation to extreme and unpredictable spatial traffic variations. As will be understood by those skilled in the art, the multi-channel links are preferably optical wavelength division multiplexed (WDM) links. FIG. 9 shows a better inter-regional connectivity, as indicated by sub-matrices 950.

The connectivity of the distributed switch shown in FIG. 5 is indicated in connection matrix 700 shown in FIG. 7. A sub-matrix 740 indicates intra-regional connectivity and a sub-matrix 750 indicates inter-regional connectivity. The edge modules are labeled according to the region to which they belong with an upper case identifying a source edge module and a lower case identifying a sink edge module. An internal path within each edge module is required for a two-hop path. An entry marked 'x' in matrix 700 indicates a direct path of one or more channels. (An uppercase X indicates a large number of channels; a lowercase x indicates a small number of channels.) The connection matrix 700 shows each region to be fully connected as sub-matrix 740 indicates. An edge module can connect to any other edge module in the same region 124 via a direct path of adjustable capacity. The interconnection between regions 124 takes place through the diagonal of connectivity shown in entries 702. For example a path from source edge module A0 to sink edge module b1 can be established in two hops, the first from source edge module A0 to sink edge module a1 and the second from source edge module A1 (which is paired with sink edge module a1) to sink edge module b1. This connection is feasible because source edge module A1 and sink edge module a1 share memory and control. The fixed connectivity obtained with the structure of FIG. 1 can be determined at installation.

Figure 8:
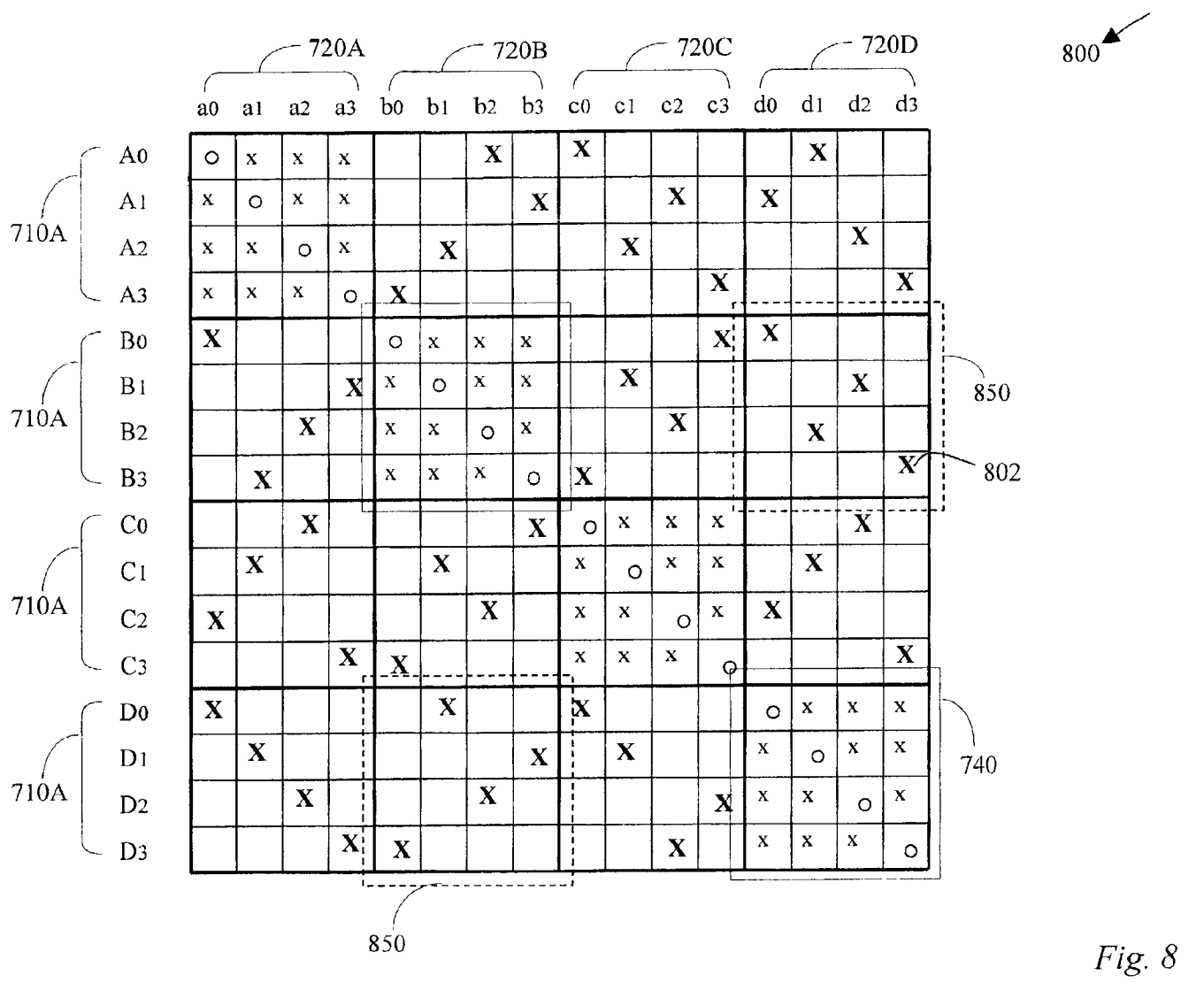

FIG. 8 shows a connectivity matrix 800 for a network structured as in FIG. 1, with the inter-region connectivity selected at installation time to be as indicated in sub-matrices 850. The intra-region connectivity, as indicated in sub-matrices 740 in FIG. 8, is the same as the intra-region connectivity shown in FIG. 7.

Connectivity matrix 900 represents the connectivity of a network 200, FIG. 2-A that employs channel shufflers between edge modules 122 and global core centers 126, or the connectivity of a network 300, FIG. 3-A, which employs cross connectors between edge modules 122 and global core centers 126. The intra-region connectivity as indicated by sub-matrices 740 remains unchanged in connectivity matrix 900. The inter-regional connectivity, as indicated by sub-matrices 950 is higher than indicated by sub-matrices 750; there are more paths, of lower capacity, from an edge module 122 to a region 124 in comparison with the network of FIG. 1-A.

If cross connectors 340 are used instead of shufflers 240, the allocation of the inter-regional channels can be adapted dynamically to traffic variations, i.e., the connectivity pattern of FIG. 9 can be changed with time.

Reconfiguration Control

Each edge module should have a timing circuit dedicated to each regional core module 140 or global core module 180. If a regional core center 128 includes C1 regional core modules 140 and the total number of global core modules 180 is C2, then each edge module 122 must have (C1+C2) timing circuits. A detailed description of a preferred timing circuit is described in U.S. patent application Ser. No. 09/286,431 filed Apr. 6, 1999 and entitled SELF-CONFIGURING DISTRIBUTED SWITCH, the specification of which is incorporated by reference.

Time-counter Period

Using an 18-bit time counter with a 64 nano-second clock period yields a timing cycle of about 16 milliseconds. With a one-way propagation delay between an edge module and any regional core module 140, of the order of five milliseconds, a time-counter period of 16 milliseconds is adequate.

A 22-bit global time counter yields a timing period of 256 milliseconds with a clock period of 64 nanoseconds (about 16 Mega Hertz). This timing period is adequate for global reconfiguration if the round-trip propagation delay between any edge module 122 and any global core module 180 to which it is connected is below 256 milliseconds.

Reconfiguration Rate

As described earlier, edge modules 122 within a network region are interconnected by regional core modules 140 to form a regional distributed switch 124. Several regional distributed switches 124 are interconnected by global core modules 180 in global core centers 126 to form a global network.

A regional core module should be reconfigured frequently to increase the agility of the regional distributed switch. Thus, it is preferable to define a network region according to geographic boundaries so that the propagation delay can be contained within acceptable bounds. The rate of reconfiguration of a regional core module 140 is bounded by the highest round-trip propagation delay from an edge module 122 to a regional core module. For example, if the round-trip propagation delay from an edge module 122 to a regional core module 140 is 4 milliseconds, then said core module can only reconfigure at intervals that exceed 4 milliseconds. Thus, among the edge modules connected to a regional core module, the edge module of highest round-trip delay dictates the reconfiguration interval. Regional core modules can be reconfigured at different times and their reconfiguration times may be staggered to reduce the reconfiguration-processing burden at source nodes.

A global core module 180 may not be able reconfigure in short periods, for example within a 20 millisecond period, due to potential large propagation delay between the global core module and the edge modules 122 to which it is connected. The one-way propagation delay between an edge module and a global core module can be of the order 100 milliseconds and the time alignment process described above requires an interchange of timing packets between reconfiguring edge modules and core modules. This requires that the reconfiguration period be larger than the round-trip propagation delay from a source edge module to any core module.

Reconfiguration Rate Limitation

The minimum interval between successive re-configurations at a core module, whether regional 140 or global 180, is dictated by the round-trip propagation delay from an edge module participating in a reconfiguration process to a selected core module 140 or 180. The {edge-module/core-module} pair with the highest propagation delay determines the reconfiguration rate. Preferably, the regional distributed switches 124 should have node pairs of moderate round-trip propagation delay to regional core modules 140, of the order of five milliseconds for example. This enables the regional distributed switches 124 to configure at a high rate, every 20 milliseconds, for example, if the extent of variations in spatial distribution of traffic intensity warrants a reconfiguration at a core module 140.

The round-trip propagation delay between an edge module 122-X in a distributed regional switch 124-X and an global core module 180-Y is expected to be higher than the round-trip delay between an edge module 122 and a regional core module 140 within a regional distributed switch 124. In the global distributed switch of FIG. 1-A, 2-A, or 3-A, frequent reconfiguration of core modules 140 can alleviate the need to reconfigure core modules 180.

Structures of Reduced Connectivity

In one extreme, the number of ports J can be selected to be zero, and each edge module connects only to core global modules, either directly, through a shuffle stage, or through a cross connector. This results in quadratic scalability as described above. With only global core centers connecting edge modules 122, the reconfiguration rate would be low, twice a second for example.

The regional core modules 140 should, preferably, have the same space-switch size, e.g., all regional core modules 140 may use 32×32 space switches. However, the number of parallel space switches in a core module may differ from one regional core module 140 to another. For example, with J=128, the 128 regional-interface ports may be divided into four regional core modules having 20, 24, 32, and 52 parallel space switches. The selection of the number of space switches per core module is governed by the spatial distribution of the source modules and their respective traffic intensity.

A space switch in a global core module is preferably of a higher capacity than that of a regional core module. For example, while a regional core module may be of size 32×32, a global core module preferably uses 64×64 parallel space switches. The number of channels K (FIG. 1) leading to the global core centers 126 is preferably selected to be larger than the number of ports of a space switch in a global core module 180 for high reachability.

Long-term Configuration of the Global Distributed Switch

A designated controller associated with each global core module 180, preferably through a collocated edge module 122, collects traffic data and trends them to characterize long-term traffic patterns. This data is used to determine the connectivity of the cross-connector 340. The rate of reconfiguration of cross-connectors is low with long intervals between successive changes; days for example. Prior to any change in a cross-connection pattern, a new route-set is computed offline and communicated to respective edge modules.

Mixture of Core Switches

The edge modules and core modules, including both the regional core modules 140 and global core modules 180, determine the scalability of the global distributed switch. Each regional core module 140 and each global core module 180 comprises parallel space switches as described earlier. The capacity of a regional core module 140 is determined by the capacity of each of the parallel space switches. The latter determines the number of edge modules that can be interconnected through the regional core modules.

As described earlier, a hop is a path from an edge module 122A to another edge module 122B, which is not switched at an intermediate edge module, other than 122A or 122B. The number of regional distributed switches 124 that can be interconnected to form a 2-hop connected global network, where each edge module 122 in a network region 124 can reach any other edge module 122 of another region 124 in at most two hops, is determined by the capacity of each of the parallel space switches in a global core module 180.

It is noted that an electronic space switch may be appropriate for use in a global core module due to its scalability (to more than 256×256 for example, with each port supporting 10 Gb/s or more).

Different regional or core modules may use optical or electronic space switches. However, preferably, a specific core module should use the same type of space switches; optical or electronic.

Independent Master Timing vs. Globally-coordinated Timing

Each regional core module 140 has its own controller 142 which is supported by an edge module 122 collocated with the regional core module 140. Similarly, each global core module 180 has its own controller 182. The timing circuit of each core module 140 or 180 is independent of timing circuits of all other core modules 140, 180. There is no benefit in using a global timing reference.

Internal Routing

To facilitate forwarding, traffic is sorted at each source edge module 122 according to sink edge module 122. At least one packet queue is dedicated to each sink edge module.

A route set is determined for each edge-module pair and is updated with each reconfiguration. Route-set update with reconfiguration is likely, however, to be minimal. A path from an edge module 122 to another edge module 122 within the same region is preferably established within the region. A path from an edge module 122-A in a region 124-A to an edge module 122-B in a different region 124-B may be established directly through a selected global core module 180. If a direct path cannot be established, then a two-hop path may be established through a first hop within the region 124-A to another edge module 122-U within region 124-A, then from edge module 122-U directly to the destination edge module 122-B through a selected global core module 180. A two-hop path may also be established through a first hop from edge module 122-A to an edge module 122-V within region 124-B then from edge module 122-V to the destination edge module 122-B through region 124-B. The route sets generated as described are computed at the edge modules 122 based on distributed connectivity information in a manner well known in the art. It is also noted that three-hop or four-hop paths may be required to carry data streams of very low traffic intensity. The use of more than two-hops can be minimized with adequate configurations.

For each pair of source edge module and sink edge module, sets of single-hop, two-hop, and more-than-two-hop routes are determined. With appropriate connectivity selection, a large proportion of traffic streams, a traffic stream being defined according to its source edge module and sink edge module, would be routed through a single hop. With wide coverage, using over 1000 edge modules 122 for example, a significant proportion (0.4 for example) of traffic streams may have to be routed through two hops. Three or more hops may be used for traffic streams of very low intensity, which would constitute a very small proportion of the total traffic load. Some sets can be empty: for example, some source-sink pairs may not have direct (single-hop) paths. The process of determining the sets is straightforward. The sets may also be sorted according to cost.

The main premise of an ideal agile-core network is that the traffic can always be routed through the shortest path, and the shortest path is continually adapted to have appropriate capacities for the load it is offered.

When the shortest path is fully assigned, a capacity increment is requested. If shortest-path capacity cannot be increased, the connection may be routed on the second best path. If the latter cannot accommodate the connection, a request is made to increase capacity of the second-best route. Finally, if the first two paths cannot accommodate the capacity-increment request, an attempt is made to accommodate the request through another path, if any, and so on. Another option is to focus only on enhancing the capacities of the shortest paths and use alternate paths in an order of preference determined by criteria such as propagation delay.

The embodiments of the invention described above are intended to be exemplary only. The scope of the invention is therefore intended to be limited solely by the scope of the appended claims.

I claim:

1. A high capacity distributed packet switch comprising a plurality at edge modules, each edge module including at least three dual ports, the at least three dual ports being organized in a group of J dual ports, a group of K dual ports and a group of L dual ports; wherein the group of J dual ports is connected by communication links to a single regional core center comprising a number of spatially distributed regional core modules;

the group of L dual ports is connected by communications links to a plurality of global core centers;

the group of K dual ports is connected by communications links to data traffic sources and data traffic sinks; and said each edge module is time-locked to at least one of said regional core modules.

2. The high capacity distributed switch as claimed in claim 1 wherein each of said plurality of global core centers comprises spatially distributed global core modules.

3. The high capacity distributed switch as claimed in claim 1 wherein each of said regional core modules comprises a plurality of parallel memory-less switches.

4. The high capacity distributed switch as claimed in claim 2 wherein each of said global core modules comprises a plurality of parallel memory-less switches.

5. The high capacity distributed switch as claimed in claim 3 wherein each of said plurality of parallel memory-less switches is an optical space switch.

6. The high capacity distributed switch as claimed in claim 4 wherein each of said plurality of parallel memory-less switches is an optical space switch.

7. The high capacity distributed switch as claimed in claim 1 wherein the plurality of edge modules are divided into groups, each group defining a region, and said group of J dual-ports of each edge module belonging to a one of the groups is connected exclusively to a respective regional core center.

8. The high capacity distributed switch as claimed in claim 1 wherein the L dual ports of said group of L dual ports of each edge module in a group of edge modules are connected directly to selected cries of the global core modules.

9. The high capacity distributed switch as claimed in claim 8 wherein the dual ports of said group of L dual ports of two or more of the edge modules in a group of edge modules are respectively connected to two or more of the global core modules via a memoryless shuffle stage.

10. The high capacity distributed switch as claimed in claim 1 wherein the dual ports of said group of L dual ports of at least two of the edge modules in a group of edge modules are respectively connected to at least two of the global core modules via a memory-less cross-connector.

11. The high capacity distributed switch as claimed in claim 1 wherein a regional core module is adaptively reconfigured in response to fluctuations in data traffic loads.

12. The high capacity distributed switch as claimed in claim 2 wherein a global core module is adaptively reconfigured in response to fluctuations in data traffic loads.

13. A high capacity distributed packet switch comprising a plurality of edge modules, each edge module including at least three dual ports, the at least three dual ports being organized into;

a group of dual ports connected by communication links to a single regional core center;

a group of L dual ports connected by communications links to a plurality of global core centers; and a group of K dual ports connected by communications links to data traffic sources and data traffic sinks;

wherein said regional core center comprises a number of spatially distributed regional core modules, end the regional core modules and their associated edge modules are spatially separated in a geographical zone bounded by a distance at which a propagation-delay of a signal traveling on a link between any core module and any associated edge module is within a predetermined upper bound.

14. A high capacity distributed packet switch comprising a plurality of edge modules, each edge module including at least three dual ports, the at least three dual ports being organized into:
   a group of J dual ports connected by communication links to a single regional core center;
   a group of L dual ports connected by communications links to a plurality of global core centers; and
   a group of K dual ports connected by communications links to data traffic sources and data traffic sinks;
wherein
   said regional core center comprises a number of spatially distributed regional core modules, and
   an edge module is collocated and associated with each regional core module, and a regional core controller is hosted by each of the edge modules collocated with the respective regional core modules.

15. A high capacity distributed packet switch comprising a plurality of edge modules, each edge module including at least three dual ports, the at least three dual ports being organized into:
   a group of J dual ports connected by communication links to a single regional core center;
   a group of L dual ports connected by communications links to a plurality of global core centers; and
   a group of K dual ports connected by communications links to data traffic sources and data traffic sinks;
wherein
   each of said plurality of global core centers comprises spatially distributed global core modules; and
   an edge module is collocated and associated with each global core module, and a global core controller is hosted by each of the edge modules collocated with the respective global core modules.

16. A high capacity distributed packet switch comprising a plurality of edge modules, each edge module including at least three dual ports, the at least three dual ports being organized into:
   a group of J dual ports connected by communication links to a single regional core center;
   a group of L dual ports connected by communications links to a plurality of global core centers; and
   a group of K dual ports connected by communications links to data traffic sources and data traffic sinks;
wherein
   each edge module maintains a route-set to every other edge module in the global distributed switch, the elements of each route-set identifying routes to a respective other edge module.

17. The high capacity distributed switch as claimed in claim 16 wherein the routes in each route-set are sorted according to a predetermined criterion.

18. A high capacity distributed packet switch comprising a plurality of edge modules, each edge module including at least three dual ports, the at least three dual ports being organized into:
   a group of J dual ports connected by communication links to a single regional core center;
   a group of L dual ports connected by communications links to a plurality of global core centers; and
   a group of K duel ports connected by communications links to data traffic sources and data traffic sinks;
wherein a cyclic time period of a control timing circuit of a regional core module is substantially shorter than a cyclic time period of a control timing circuit of a global core module.

19. The high capacity distributed switch as claimed in claim 18 wherein the control timing circuit for each of the regional core modules comprises an 18-bit counter, the control timing circuit for each of the global core modules is a 22-bit counter, and the clock rate for all of the regional and global core modules is 16 megahertz.

20. The high capacity distributed switch as claimed in claim 18 wherein a rate at which a global core module is reconfigured is substantially lower than a rate at which a regional core module is reconfigured.

21. A high capacity distributed packet switch comprising a plurality of edge modules, each edge module including at least three dual ports, the at least three dual ports being organized into:
   a group of J dual ports connected by communication links to a single regional core center;
   a group of L dual ports connected by communications links to a plurality of global core centers; and
   a group of K dual ports connected by communications links to data traffic sources and data traffic sinks;
wherein
   the dual ports of said group of L dual ports of at least two of the edge modules in a group of edge modules are respectively connected to at least two of the global core modules via a memory-less cross-connector; and
   the memoryless cross-connectors are configured based on long term spatial traffic distribution estimations and projections.

22. The high capacity distributed switch as claimed in claim 21 wherein new route-sets are distributed to each edge module controller prior to reconfiguration of said memoryless cross connectors.

* * * * *